United States Patent Office 3,043,835
Patented July 10, 1962

3,043,835
11-OXYGENATED 17α-CARBOXYETHYL - 17β - HYDROXYANDROSTA-1,4-DIEN-3-ONE LACTONES
Edward A. Brown, Wilmette, Ill., assignor to G. D. Searle & Co., Chicago, Ill., a corporation of Delaware
No Drawing. Filed July 1, 1960, Ser. No. 40,167
3 Claims. (Cl. 260—239.57)

This invention relates to 11-oxygenated 17-carboxyethyl-17-hydroxyandrosta - 1,4-dien-3-one lactones and processes for the manufacture thereof. More particularly, this invention relates to chemical compounds of the formula

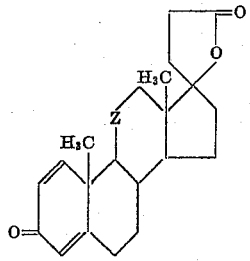

wherein Z represents a carbonyl or hydroxymethylene radical. As between α and β (relative to configuration on the steroid nucleus) an α-hydroxyl is preferred in position 11 and a β-hydroxyl at 17.

Equivalent to the foregoing lactones for the purposes of this invention are corresponding hydroxy acids, of the formula

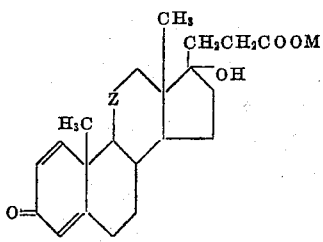

wherein Z is defined as before and M represents hydrogen, an alkali metal, or the ammonium radical. Likewise equivalent are the alkaline earth salts of the described hydroxy acids.

The compounds to which this invention relates are useful by reason of their valuable pharmacological properties. Specifically, they are anti-secretory agents characterized by a wholly unexpected capacity to inhibit pepsin activity.

Manufacture of the 11α-hydroxy lactone hereof proceeds by heating the corresponding 1,2-dihydro lactone [described and claimed in the patent application of John A. Cella, Serial No. 833,956, filed August 17, 1959] with selenium dioxide in a mixture of acetic acid and tertbutyl alcohol. The 11-oxo lactone hereof derives, in turn, from the 11-hydroxy material upon oxidation with chromium trioxide in acetic acid. As to the salts set forth as equivalent to the lactonized products, those skilled in the art will recognize that they are readily obtained from the apposite lactones on contact with appropriate aqueous bases, for example, KOH, NaOH, $NH_4OH$, $Ca(OH)_2$, etc. The free acids, in turn, are produced from the salts by a critically brief exposure to a proton source. Prolongation of exposure time induces lactonization.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, relative amounts of materials are given in parts by weight, except as otherwise noted.

EXAMPLE 1

17α-(2-Carboxyethyl)-11α,17β-Dihydroxyandrosta-1,4-Dien-3-One γ-Lactone

A solution of 10 parts of 17α - (2 - carboxyethyl)-11α,17β-dihydroxyandrosta-4-en-3-one γ-lactone, 3 parts of selenium dioxide, 5 parts of glacial acetic acid, and 400 parts of tert-butyl alcohol is heated at the boiling point under reflux for 4 hours. An additional 3 parts of selenium dioxide is then introduced, whereupon heating at the boiling point under reflux is continued 20 hours longer. A trace of insoluble material is filtered out, and the filtrate is stripped of solvent by vacuum distillation. The oily residue is taken up in dichloromethane; and the dichloromethane solution is washed successively with water, dilute aqueous sodium bicarbonate, and water. The solution is then dried over anhydrous sodium sulfate, and solvent is again removed by vacuum distillation. The amorphous solid residue is chromatographed on silica gel, using benzene and ethyl acetate as developing solvents. From the eluate comprising equal quantities of benzene and ethyl acetate, on evaporation of solvent, a crystalline solid is obtained. This material is 17α-(2-carboxyethyl)-11α,17β - dihydroxyandrosta - 1,4 - dien - 3-one γ-lactone which, recrystallized from ethyl acetate, melts at 238–242°. The product has the formula

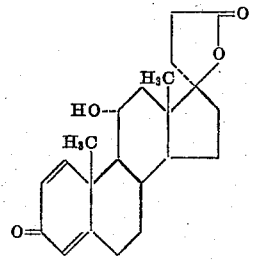

EXAMPLE 2

17α-(2-Carboxyethyl)-17β-Hydroxyandrosta-1,4-Diene-3,11-Dione γ-Lactone

To a solution of approximately 26 parts of 17α-(2-carboxyethyl)-11α,17β-dihydroxyandrosta-1,4-dien-3 - one γ-lactone in 1500 parts of glacial acetic acid at around 5° is slowly added 100 parts of water containing, in solution, 10 parts of chromium trioxide. Temperatures of the order of 5–10° are thereupon maintained for 5 hours, at which point 400 parts of ethyl alcohol is cautiously introduced. The resultant solution is mixed into 15,000 parts of cold water, and the mixture thus obtained is extracted with ether. The ether extract is washed with water, then dried over anhydrous sodium sulfate, and finally stripped of solvent by distillation. The residue is 17α-(2-carboxyethyl)-17β-hydroxyandrosta - 1,4 - diene-3,11-dione γ-lactone which, recrystallized from ethyl acetate, melts at 239–243°. The product has the formula

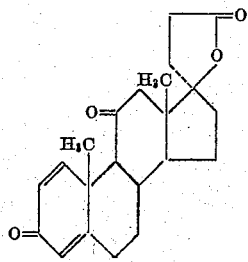

What is claimed is:
1. A compound of the formula
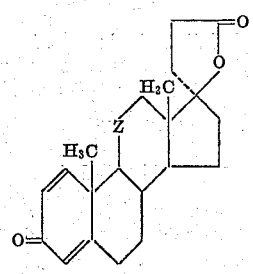
wherein Z is selected from the group consisting of carbonyl and α-hydroxymethylene radicals.
2. 17α-(2-carboxyethyl) - 11α,17β - dihydroxyandrosta-1,4-dien-3-one γ-lactone.
3. 17α-(2-carboxyethyl)-17β - hydroxyandrosta - 1,4-diene-3,11-dione γ-lactone.
References Cited in the file of this patent
UNITED STATES PATENTS
| | | |
|---|---|---|
| 2,837,464 | Nobile | June 3, 1958 |
| 2,925,416 | Brown et al. | Feb. 16, 1960 |